United States Patent [19]

Dinter et al.

[11] Patent Number: 4,940,521

[45] Date of Patent: Jul. 10, 1990

[54] PROCESS AND APPARATUS FOR PRETREATING THE SURFACE OF A SINGLE-LAYER OR MULTILAYER MOLDED MATERIAL BY MEANS OF AN ELECTRICAL CORONA DISCHARGE

[75] Inventors: Peter Dinter, Oestrich-Winkel; Hermann Dallmann, Wiesbaden; Lothar Bothe, Mainz; John D. Gribbin, Schlangenbad, all of Fed. Rep. of Germany

[73] Assignee: Hoechst Aktiengesellschaft, Frankfurt am Main, Fed. Rep. of Germany

[21] Appl. No.: 391,064

[22] Filed: Aug. 8, 1989

[30] Foreign Application Priority Data

Aug. 16, 1988 [DE] Fed. Rep. of Germany ....... 3827629

[51] Int. Cl.[5] ................................ B05D 3/14

[52] U.S. Cl. .............................. 204/164; 204/165; 204/168; 204/169; 204/170; 427/39; 427/40; 427/41; 118/620; 422/186.05; 422/186.06; 422/907

[58] Field of Search ............... 204/164, 165, 168, 169, 204/170; 118/620; 427/39, 40, 41; 422/186.05, 186.06, 907

[56] References Cited

U.S. PATENT DOCUMENTS 3,142,630 7/1964 Antokal et al. .................... 204/156
3,274,089 9/1966 Wolinski ............................ 204/165
3,291,712 12/1966 McBride ............................ 204/165
3,396,308 8/1968 Whitmore ........................... 204/165
3,397,132 8/1968 Wolinski ............................ 204/165
3,600,122 8/1971 Coleman ............................ 204/168
3,661,735 5/1972 Drelich .............................. 204/165

FOREIGN PATENT DOCUMENTS 938325 10/1963 United Kingdom .

*Primary Examiner*—John F. Niebling
*Assistant Examiner*—David G. Ryser
*Attorney, Agent, or Firm*—Gregory N. Clements

[57] ABSTRACT

Pretreating the surface of electrically conducting molded materials, such as metal foil or plastic films in whose polymer matrix electrically conducting particles have been incorporated, by means of electrical corona discharge is provided. A generator subjects the high voltage discharge electrodes of the corona discharge to a high-frequency alternating current of high voltage. The metal core of a roller, over whose metallic circumference a film web or foil is transported, serves as the grounded metallic counter-electrodes. A housing encloses the high voltage electrodes of the corona discharge and is connected via a line to an atomizer apparatus, in which a liquid is atomized to give a suspendible aerosol by means of a piezoelectric ultrasonic vibrator system or by two-material atomizer nozzles operating at the speed of sound. A blower whose throughput can be regulated is connected to the atomizing apparatus and conveys the carrier gas, for example air, for the aerosol through the atomizing apparatus into the corona discharge.

23 Claims, 4 Drawing Sheets

PROCESS AND APPARATUS FOR PRETREATING THE SURFACE OF A SINGLE-LAYER OR MULTILAYER MOLDED MATERIAL BY MEANS OF AN ELECTRICAL CORONA DISCHARGE

BACKGROUND OF THE INVENTION (1) Field Of The Invention

The invention relates to a process for pretreating the surface of a single-layer or multilayer molded material by means of an electrical corona discharge which takes place between high voltage electrodes and a grounded counter-electrode, between which the single-layer or multilayer molded material is located, and an apparatus for pretreating the surface of the molded material. The present invention is particularly suitable for electrically conducting molded materials.

(2) Prior Art

In many cases, the normally smooth surface of molded plastic materials, in particular of films, presents difficulties in that the film webs have extremely good slip and readily tend to telescope when being wound on a roll. Further difficulties arise during treatment of these materials for increasing the adhesion of printing inks, coatings, adhesives, metals applied by vapor deposition, and the like due to the smooth surfaces of films or molded materials. The prior art for overcoming these difficulties includes physicochemical surface modification of plastics, in particular of films. A basic process which only produces changes on the surface of the plastic consists of pretreating the surface of the plastic by means of an electrical corona discharge.

According to German Offenlegungsschrift No. 3,247,795, corona pretreatment of a film web of plastic is carried out by a procedure in which the upper surface and/or the lower surface of the film web are exposed to a corona which results in different pretreatment intensities. For this purpose, the film web to be treated is fed over an electrically grounded roller, and electrical charging is effected by exposure of that surface of the film web which faces away from the roller surface to an electrical corona discharge. The electrical corona discharge is generated by applying a high-frequency alternating current of high voltage to an electrode spaced a small distance away from the roller. The pretreatment is carried out in general in air under atmospheric pressure.

The constantly increasing market requirements of products having improved surface properties have also led to the development of processes using chemically reactive substances which, for example, cleave certain chemical bonds in the surface and thus alter the surface properties of plastic. U.S. Pat. No. 3,142,630 describes a process for increasing the adhesion, in which a film web is passed through a non-ionizing liquid and is exposed to a corona discharge in the liquid. This liquid may be, for example, a transformer cooling oil, vegetable oil or another pure oil, which is free from impurities and which is substantially electrically nonconducting.

British Patent No. 938,325 describes a process for the pretreatment of thermoplastic films, in which an electrical corona discharge takes place at the surface in a nitrogen atmosphere. The nitrogen is passed via distribution lines, through hollow electrode lines, into the corona discharge zone.

In the arrangement described in U.S. Pat. No. 3,274,089, organic compounds from the group consisting of polymerizable organic compounds, non-polymerizable organic compounds having substitutable hydrogen atoms and perhalogenated hydrogen are passed into the corona discharge zone through distribution lines in order to modify the surface of film webs or articles made of polymers.

The common feature of these known processes is that reactive gases are passed into the corona discharge region between the electrodes, or the corona discharge is allowed to take place in a nonconducting liquid.

Japanese Patent No. 17 747/73 discloses an apparatus in which a film surface is exposed to a corona discharge. The electrode connected to the generator consists of porous sintered metals and of a plurality of metal nets. The high voltage discharge electrode is shaped in such a way that liquid fed into it accumulates and is stored. As a result of the voltage applied to the discharge electrode, the stored liquid is converted into the gas phase and emerges from the porous sintered metals in the form of gas particles, which move toward the film surface under the influence of the electric field lines of the corona discharge.

In the apparatuses and processes which include a liquid as the discharge electrode in the corona discharge process, it is necessary to rely on special apparatuses which permit storage or accumulation of the liquid and furthermore must consist of a material which allows the liquid converted into the gas phase to pass there through into the corona discharge zone. If the film web to be pretreated is passed through a liquid in which the corona discharge takes place, the transport velocity of the film web through the liquid is obviously limited. If a corona discharge is effected in a reactive atmosphere on the surface of the plastic, various layers can be subsequently applied by further process measures to treat the surface of the plastic. Coating simultaneously with the pretreatment is not possible in such a case. The same applies to pretreatment of surfaces of plastics where the corona discharge is carried out on the surface in a liquid.

SUMMARY OF THE INVENTION

It is the object of the invention to design a process and an apparatus, as described at the outset, in such a way that single-layer or multilayer molded materials can be pretreated with reactive substances in liquid form, and these substances can also be applied at the same time as special layers on the surfaces of the molded materials for treating the surfaces.

This object is achieved, according to the invention, by the process described at the outset, if the corona discharge is directed toward at least a portion of one surface of said molded material, within said corona discharge zone, and at the same time an aerosol is introduced into said corona discharge zone by means of an air or gas stream, said aerosol being formed by atomizing a liquid.

Apparatus, according to the invention, for pretreating the surface of molded material by means of an electrical corona discharge, includes first electrodes which are subjected to a high-frequency alternating current of high voltage by a generator, and which are arranged some distance away from a grounded counter-electrode. The first electrodes of the corona discharge means are covered with dielectric material and are shielded from the environment by a first housing which is connected via a line to an atomizing apparatus for atomizing liquid to yield a suspendible aerosol. The grounded counter-electrode has a metallic surface. A blower whose throughput can be regulated and is connected to the atomizing apparatus conveys the carrier gas for the aerosol through the atomizing apparatus into the housing of the corona discharge means.

In the embodiment of the apparatus, the atomizing apparatus consists of a piezoelectric ultrasonic vibrator system, or the atomizing apparatus has two-material atomizer nozzles operating at the speed of sound.

The corona discharge triggers reaction mechanisms which chemically modify the surface of the treated molding. Depending on the type of aerosol liquid used and the type of carrier gas for the aerosol, active centers are produced on the treated surface of the molded material, in the form of functional groups and radicals, which constitute reactants for the applied substances for subsequent processes. Depending on the type of aerosols and carrier gases used, polymerizable or crosslinking layers can also be applied to the surface in this way in a single process step. The molded materials may be purely metallic single-layer foils, for example aluminum foils, as used in the production of laminates, or plastic substrates which have been rendered electrically conducting, such as film webs whose surface has been partly or completely printed with printing inks containing metal pigments, or which have been provided with metal layers by vapor deposition. The film webs can be provided with layers of dispersions containing magnetic particles in the case of magnetic recording media, or with layers containing carbon black as a filler in the case of thermal printer ribbons. While metallic, non-insulated high-voltage electrodes/grounded insulated counter-electrode can be used in the corona treatment of pure plastic materials, this combination cannot be employed in the present invention. Instead, dielectrically insulated high-voltage electrodes are used together with a grounded metal roller as the counter-electrode. In the case of electrically conducting molded materials, only this electrode configuration permits the formation of electric field strengths required for plasma ignition by the corona discharge.

BRIEF DESCRIPTION OF THE DRAWINGS

Details of the process according to the invention and of illustrative examples of the apparatus according to the invention are described in detail below with reference to the drawings.

DESCRIPTION OF THE PREFERRED EMBODIMENTS

Figure 1:
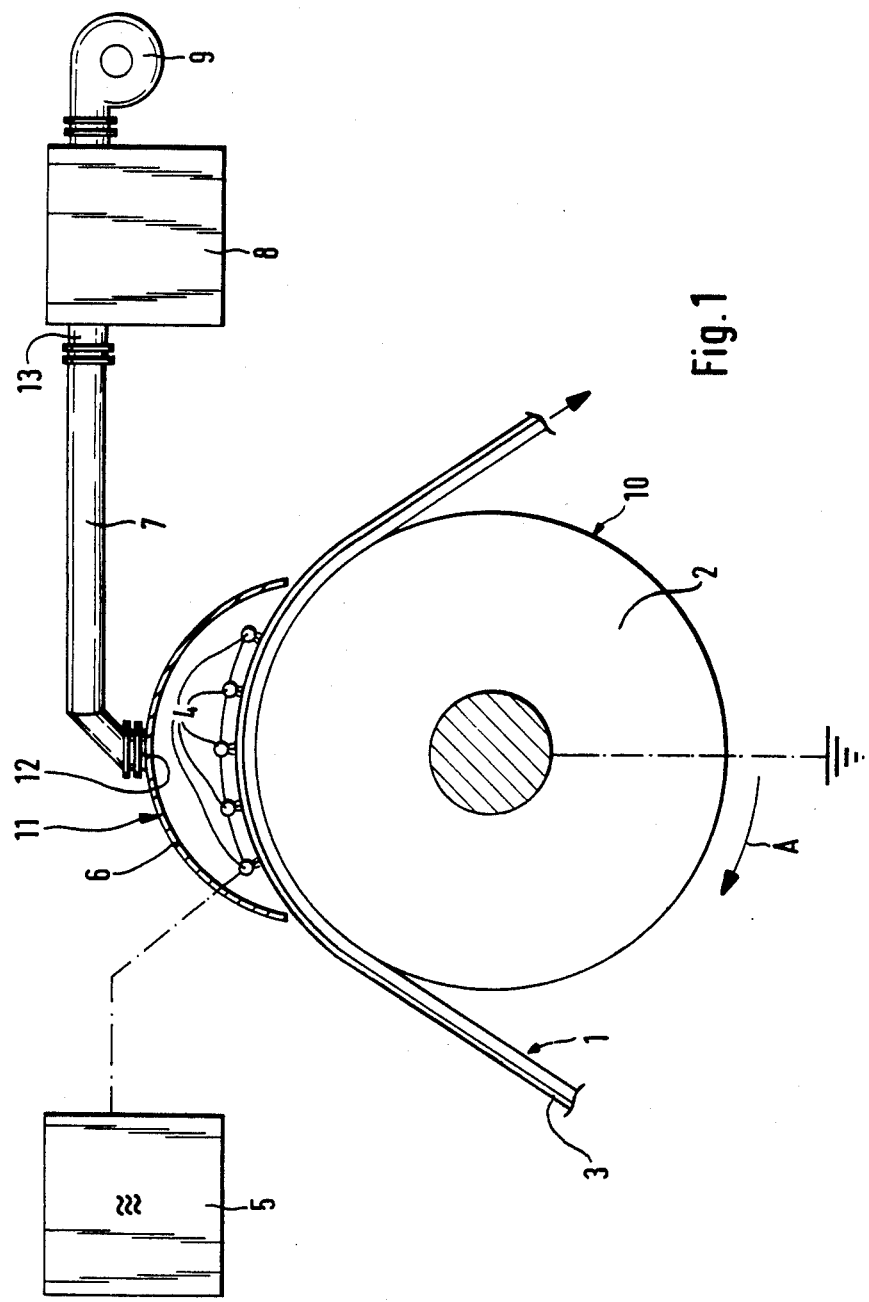
FIG. 1 shows a schematic view of an apparatus for pretreating the surfaces of molded materials by means of an electrical corona discharge.

FIG. 1 shows an apparatus, consisting of a roller 10, over which a film web 1 to be treated and an electrically conducting layer 3 is passed. A first corona discharge means 11 comprises a housing 6 and electrodes 4 which are connected to a generator 5. The electrodes 4 are, for example, metallic stranded wires having a diameter of 0.8 mm covered by a dielectric material, for example a silicone rubber layer, of 2 mm thickness, so that the diameter of the covered electrodes is 4.8 mm. The roller consists of a metallic roller core 2 without a dielectric coating. The roller core 2 is grounded so that the roller 10 forms the counter-electrode to the electrodes 4 of the corona discharge means 11. The distance between the electrodes 4 and the film web 1 is up to about 2 mm. The roller 10 turns in the direction of the arrow A. The generator 5 supplies the electrodes 4 with a high-frequency alternating current of high voltage. As a result, an electrical corona discharge is created between the grounded roller 10 and the electrodes 4. The film web 1 is passed through the field lines of the said discharge, which are shown schematically in FIG. 1. The electrodes 4 are shielded from the environment by the housing 6, which is connected to an atomizing apparatus 8 via a line 7, for example a rigid pipe or a hose or flexible line. The line 7 is connected at one end to a pipe socket 12 of the housing 6 and at the other end to a pipe socket 13 of the atomizing apparatus 8. In the atomizing apparatus 8, the particular liquid to be introduced is atomized to give a suspendible aerosol, which is transported into the corona discharge means 11 by air or a carrier gas stream delivered by a blower 9 whose throughput can be regulated. The film web 1, the liquid to be atomized to give the aerosol, and the carrier gas used to transport the aerosol may be heated to a temperature between 20° and 95° C. The atomizing apparatus 8 is a conventional two-material atomizer nozzle, in which the liquid is divided into tiny droplets by the carrier gas, for example air, emerging at the speed of sound, or is a piezoelectric ultrasonic vibrator system which, as a result of its vibrations, causes the carrier gas or the air to vibrate correspondingly so that the carrier gas or air can divide the liquid up into tiny droplets. The blower 9 is flanged directly to the atomizing apparatus 8. The aerosol introduced or blown into the housing 6 of the corona discharge means 11 becomes uniformly distributed inside the housing 6 and migrates along the field lines, which run from the electrodes 4 toward the film web 1, to the film surface and is deposited there. This results in very uniform wetting or coating of the film web 1 with the aerosol, so that very uniform modification of the surface properties of the film web occurs.

The electrodes 4, as discharge electrodes, have an open design, i.e., an electrode form with a sufficiently large free cross-section between the individual electrodes. Wire electrodes covered with a dielectric material and arranged parallel to the axis around the circumference of the roller 10 are among electrodes which have proven suitable for this purpose. Apart from activation of the surface of the film web, special coatings can be applied to the film web. In many cases, extremely thin layers are sufficient for modifying the surface properties, such as, for example, antistatic properties, abrasion resistance, static and sliding friction behavior, barrier properties, adhesion and adhesion promotion of a film in the desired manner. Monomers, dispersions, solutions of low molecular weight and/or high molecular weight polymer components and colloidal systems, which can be used in aqueous form or dissolved in solvents, are, inter alia, suitable for the preparation of the aerosols.

The electrodes 4 of the corona discharge means 11 are supplied by the generator 5 with an alternating current voltage between 5,000 V and 25,000 V. The alternating current voltage applied between the electrodes 4 and the roller 10 or its core 2, as the grounded counterelectrode, is made proportional to the transport velocity of the film web 1 through the corona discharge means 11. Investigations have shown that, as the transport velocity is increased, the applied alternating current voltage delivered by the generator 5 must also be increased in order to achieve uniform modification of the surface of the film web 1.

This relationship between the transport velocity and the applied generator voltage is evidently due to the fact that at higher transport velocity of the film web 1, a larger amount of antistatic material (for example) must be sprayed at the same time onto the film web in order to obtain uniform coating of the surface of the film web. The amount of antistatic material supplied is increased by increasing the applied generator voltage.

Figure 2:
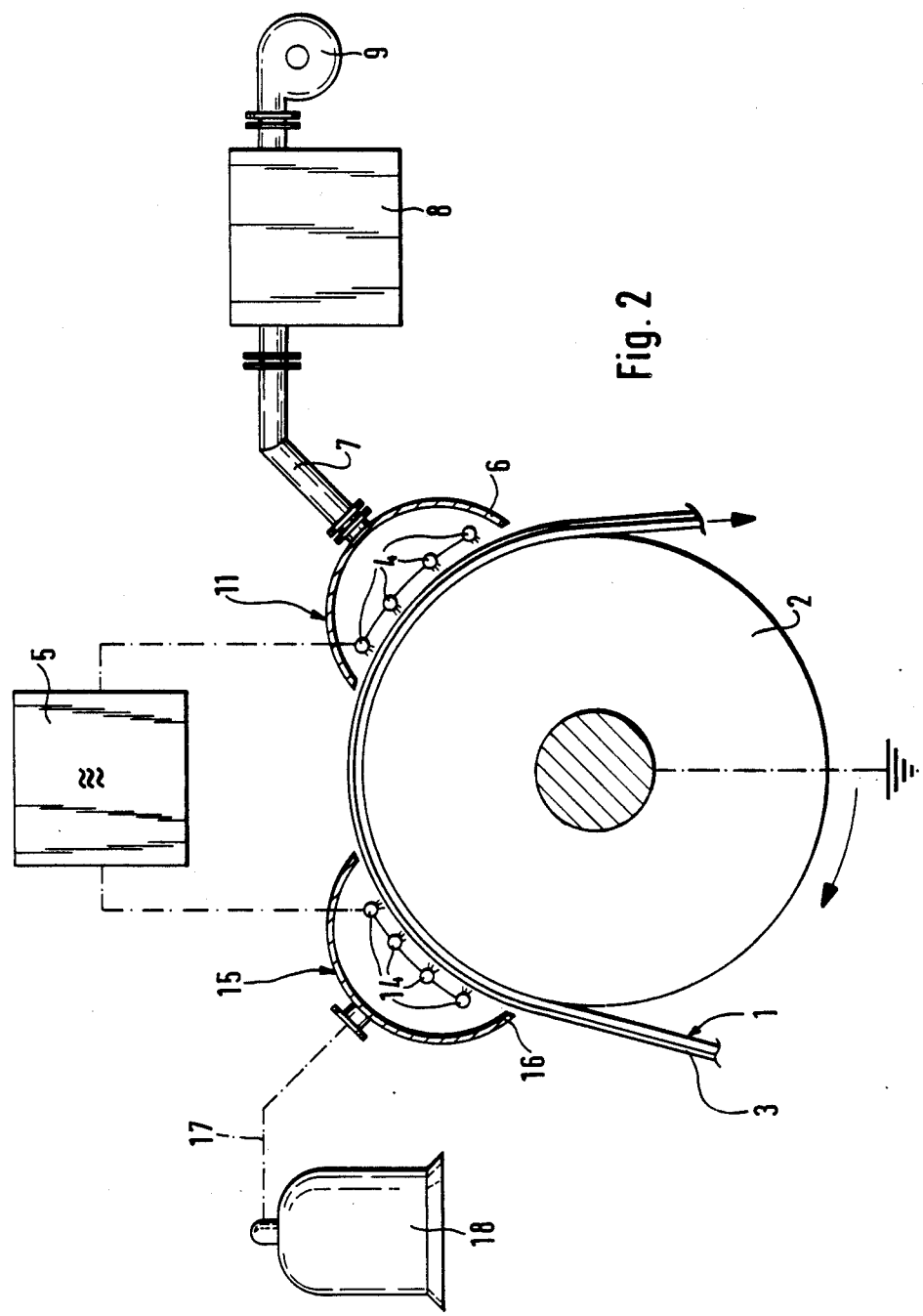
FIG. 2 shows a schematic view of an apparatus for pretreating the surfaces of molded materials, the apparatus comprising two corona discharge means.

FIG. 2 shows an embodiment of the invention which has a similar structure to FIG. 1 and in which a second corona discharge means 15 is arranged upstream of the first corona discharge means 11 in the transport direction of the film web 1 with an electrically conducting layer 3. The electrodes 14 of the second corona discharge means are shielded by a housing 16 which is connected to a gas container 18 via a line 17. The electrodes 14 are, for example, steel stranded wires having a diameter of 0.8 mm covered with a dielectric material. The thickness of the dielectric material is 2 mm, the material being a silicone rubber. In all corona discharge means, it is of course also possible to use other electrode embodiments, such as small quartz glass, porcelain or ceramic tubes filled with electrically conducting material, or metal sections coated with oxide ceramic by flame spraying, or the like. The generator 5 feeds both the electrodes 4 of the first corona discharge means 11 and the electrodes 14 of the second corona discharge means 15. The other components of this arrangement, such as the atomizing means 8 and the blower 9, are identical to the corresponding components of the arrangement according to FIG. 1 and will therefore not be described again.

In the apparatus according to FIG. 2, a combined pretreatment of the film web 1 is carried out. The film web is first subjected to a corona discharge in a reactive atmosphere in the region of the second corona discharge means 15, i.e., surface modification of the film web 1, before the treatment by application of an aerosol to the film surface by means of the corona discharge from the first corona discharge means 11. By feeding a gas from the gas container 18 into the second corona discharge means 15, it is possible to carry out a tailored modification or activation of the film web to be treated, in the corona discharge zone of the first corona discharge means 11. For example, nitrogen or other nitrogen-containing gaseous compounds can be used as the reactive gas.

The gas container 18 is connected to the housing 16 of the second corona discharge means 15 via a line 17. Usually the pressure of the gas flowing out of the gas container 18 is regulated by a pressure-reducing valve, which is not shown. FIG. 2 shows that the discharge electrodes 4 and 14 of the two corona discharge means 11 and 15 are supplied with voltage jointly by the single generator 5, although an arrangement in which the electrodes of each corona discharge means are supplied with high voltage by a separate generator is also possible.

Figure 3:
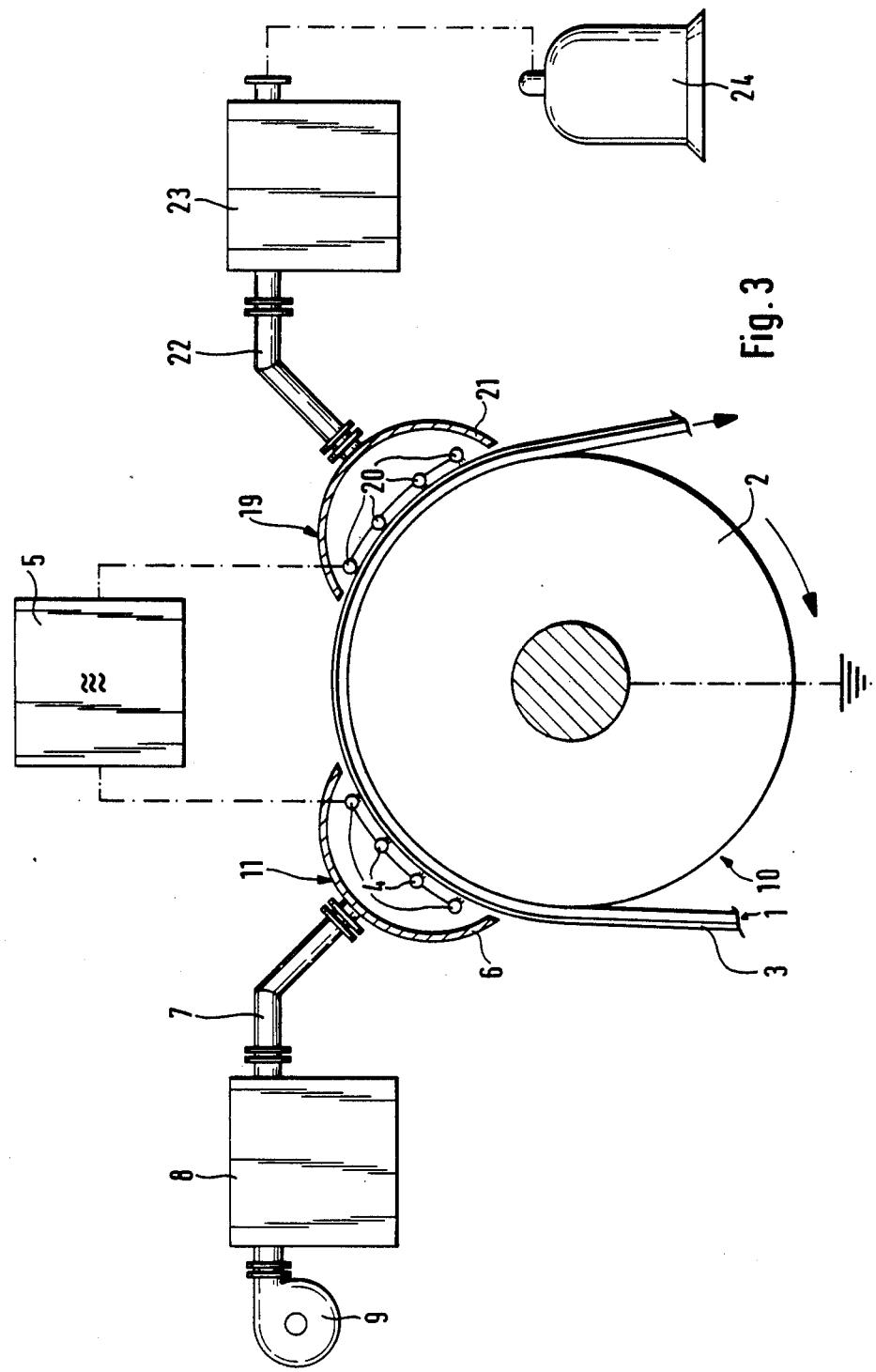
FIG. 3 shows a schematic view of a further apparatus for pretreating the surfaces of molded materials, having two corona discharge means.

FIG. 3 shows an embodiment of the invention in which two apparatuses corresponding to the apparatus shown in FIG. 1 are arranged along the circumference of the roller 10. The first corona discharge means 11 with the connected atomizing apparatus 8 and the blower 9 substantially corresponds to the apparatus as described by FIG. 1. In the transport direction of the film web 1, a third type of corona discharge means 19 having electrodes 20, whose housing 21 encloses the electrodes 20, is provided downstream of the first corona discharge means 11. The electrodes 20 have a covering consisting of a dielectric material and have the same structure as the electrodes of the first and second corona discharge means. The housing 21 is connected via a pipe socket and a line 22 to a pipe socket of an atomizing apparatus 23, to which a gas container 24 is connected. A carrier gas for the aerosol, which is produced in the atomizing apparatus 23 from the treatment liquid, is stored in the gas container 24. Other suitable carrier gases, in addition to air and nitrogen, are various noble gases.

The electrodes 4 and 20 of the first and third corona discharge means 11 and 19, respectively, are connected to the common generator 5. In this apparatus, however, it is also possible for voltage to be applied to each of the corona discharge means via a separate generator.

Either air or a gas can be blown into the atomizing apparatus 8 via the blower 9. The air or gas serving as a carrier gas for the particular aerosol is fed into the corona discharge means 11. With the apparatus shown, two different liquids or their aerosols can be used and furthermore different carrier gases can be employed for the particular aerosol. Owing to the combination of liquid and gaseous reactants, this apparatus permits modification of the surface of the film web 1 in a variety of ways. Depending on the type of substances used, it is also possible to apply polymerizable or crosslinking layers to the film web surface by means of the aerosols. The film web 1 can consist of polypropylene, polyester or polyvinyl chloride. Possible transport velocities for the film web 1 are in the range from 20 to 200 m/min.

Figure 4:
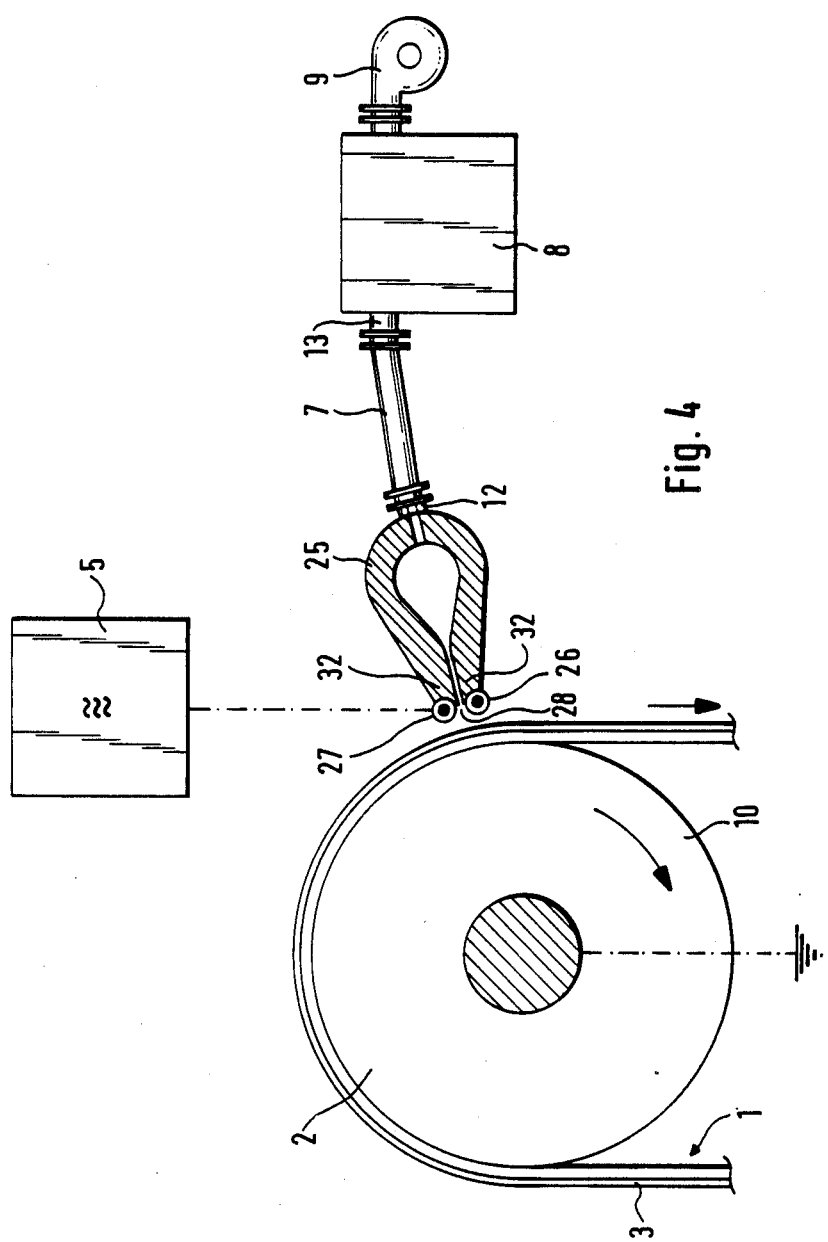
FIG. 4 shows another embodiment of the apparatus according to the invention, having a corona discharge means, arranged at the outlet gap of a slot-like air nozzle, for pretreating the surface of a molded material.

FIG. 4 shows a modified embodiment of the apparatus, which differs from the apparatuses according to FIGS. 1 to 3 in that the aerosol produced in the atomizing apparatus 8 is blown by the blower 9 via the line 7 into a slot-like air nozzle 25. The line 7 is connected to the air nozzle 25 and the atomizing apparatus 8 via pipe sockets 12 and 13. Discharge electrodes 27 which are under high voltage and in the form of metal wires, which are drawn or fused in a small quartz tube 26, are arranged on the nozzle lips 32, 32, which define the outlet gap 28 of the air nozzle 25. The grounded counter-electrode to the discharge electrodes 27 is formed by the roller core 2 of the roller 10, over part of whose circumference is passed the film web 1 which is to be treated and has an electrically conducting layer 3. The generator 5 subjects the electrodes 27 to a high-frequency alternating current of high voltage. The aerosol emerging from the air nozzle 25 passes directly into the field of the corona discharge. Because of the electric field applied to the electrodes 27, the aerosol droplets are held in the electric field and are prevented from wandering about the environment in an uncontrolled manner, resulting both in further improved uniformity of the layers applied to the substrate and in substantially loss-free utilization of the amount of aerosol available.

The apparatus having an air nozzle and shown in FIG. 4 can of course also be used in the configuration shown in FIG. 3 in place of any of the apparatuses used there.

The process and the apparatuses can be used for surface modification of plastic films which have been provided with an electrically conducting coating, printed or coated with metal by vapor deposition on part of, or all of the surface of the films, or for the surface modification of pure metal foils. It is also possible to modify the surface of plastic films, papers, filaments, fibers, woven fabrics and knitted fabrics in whose matrix metallic or other electrically conducting particles have been incorporated. The pretreatment can be carried out both on the conducting and on the nonconducting substrate surface.

By including liquids, especially in the form of aerosols, in the corona discharge processes, the process according to the invention, for the modification of electrically conducting plastic surfaces with the aid of corona discharge, considerably extends the possibilities of chemical modification of surfaces of plastic materials. Depending on the type of liquids used for the aerosols and on the transport gases for the particular aerosols, the subsequent finishing steps, such as coating, printing, laminating, painting or tailored surface modification, can be adjusted or chemically active layers can be applied to the treated electrically conducting plastic surfaces.

A range of substances which can be introduced as aerosols into the corona discharge means is tabulated below. In Table 1, the use and the type of surface modification of the plastic which can be achieved are stated in each case for the individual substances. This range makes no claim to completeness and does not restrict the invention, since in principle all substances which form aerosols and which can modify plastic surfaces in the desired manner can be used.

TABLE 1

| Substances for aerosols | Properties of the plastic surfaces after the modification |
| --- | --- |
| Polyurethane | Adhesion promotion |
| Polyvinyl alcohol | |
| Copolyester | |
| Acrylate | |
| Acrylate | Slip/adhesion promotion |
| Polyvinylidene chloride | Barrier properties/ adhesion promotion |
| Fluoropolymer | Slip/antiadhesion |
| Fluoroacrylate | |
| Perfluoropolyether | |
| Polyethersiloxanes | |
| Quaternary ammonium salt | Antistatic agents |
| Choline ester chloride | |
| Alkysulfonate | |
| Alkylsulfate | |
| Dialkyldimethylammonium chloride polymer | |

That which is claimed:

1. A process for pretreating the surface of a single-layer or multilayer molded material by means of an electrical corona discharge treatment taking place in the space between high voltage discharge electrodes and a grounded counter-electrode space therefrom, said space between said high voltage electrodes and said ground counter-electrode forming a corona discharge zone, where said single-layer or multilayer molded material is located, said process comprising: locating at least a portion of one surface of said molded material within said corona discharge zone; corona treating said molded material in said corona discharge zone; and at the same time introducing, by means of an air or gas stream, an aerosol into the corona discharge zone, said aerosol being formed by atomizing a liquid.

2. The process as claimed in claim 1, wherein said corona treatment of said molded material occurs at the surface by a corona discharge in a first step and, in a second step, by a corona discharge in an aerosol atmosphere.

3. The process as claimed in claim 1, wherein said corona treatment of said molded material includes treatment by two or more corona discharges in sequence, each of said corona discharges being produced in a different aerosol atmosphere.

4. The process as claimed in claim 1, wherein said aerosol is selected from the class of monomers, dispersions, solutions of low molecular weight polymer compounds, solutions of high molecular weight polymer components, mixtures of low and high molecular weight polymer components, colloidal systems in aqueous form, and colloidal systems dissolved in solvents.

5. The process as claimed in claim 1, wherein said aerosol produced by atomization is blown into said corona discharge zone by means of an air nozzle having an outlet, and the corona discharge occurs directly at the outlet of said air nozzle.

6. The process as claimed in claim 1, further comprising the step of heating the molded material to be treated, the liquid to be atomized to give the aerosol, and the carrier gas used to transport the aerosol to a temperature between 20° and 95° C.

7. The process as claimed in claim 1, wherein said molded material is a metal foil having a surface treated with said aerosol.

8. The process as claimed in claim 1, wherein said molded material consists of plastic films in whose polymer matrix electrically conducting particles are embedded.

9. The process as claimed in claim 1, wherein said molded material consists of plastic films provided partially or completely on one or both aides with electrically conducting layers.

10. The process as claimed in claim 1, wherein said molded material is selected from the group consisting of metallized papers, paper laminated with metal foils, metallized filaments, fibers, knitted fabrics or woven fabrics.

11. The process as claimed in claim 1, further comprising the step of decomposing said aerosol in said corona discharge zone, and coating said molded material with said decomposed aerosol.

12. Apparatus for pretreating the surface of a molded material, comprising: a first electrostatic corona discharge means having first high voltage electrodes and a grounded counter-electrode having a metallic surface, said first high voltage electrodes being covered with dielectric material and arranged a distance away from said counter-electrode; a high-frequency, high voltage generator connected with said first high voltage electrodes; a first housing for shielding said first high voltage electrodes from the environment; an atomizer for atomizing liquid to yield a suspendible aerosol; a first line connected to said first housing on one end and to said atomizer on the other end; and a blower whose throughput can be regulated and which is connected to the atomizer which conveys the carrier gas for the aerosol through the atomizer into said first housing via said first line.

13. Apparatus as claimed in claim 12, wherein the atomizer comprises a piezoelectric ultrasonic vibrator system.

14. Apparatus as claimed in claim 12 wherein the atomizer comprises a two-material atomizer nozzles operating at the speed of sound.

15. Apparatus as claimed in claim 12, wherein said generator supplies said high voltage electrodes with an alternating current voltage of 5,000 V to 25,000 V.

16. Apparatus as claimed in claim 15, wherein said alternating current voltage applied to the high voltage electrodes is proportional to the transport velocity of said molded material through said first corona discharge means.

17. Apparatus as claimed in claim 12, wherein a second corona discharge means including second high voltage electrodes covered with dielectric material is located ahead of said first corona discharge means, seen in the direction of transport of said molded material, said second high voltage electrodes being spaced away from said grounded counter-electrode, a high voltage generator connected to said second high voltage electrodes; said second corona discharge means furthermore including a second housing shielding said second high voltage electrodes; a source of gas; a second line connected to said source of gas and to said second housing.

18. Apparatus as claimed in claim 17, wherein said first and second high voltage electrodes are connected to a common high voltage generator 19. Apparatus as claimed in claim 12, wherein a third corona discharge means including third high voltage electrodes is located after said first corona discharge means, seen in the direction of transport of said molded material; said third high voltage electrodes being spaced away from said grounded counter-electrode and are covered with dielectric material; a high voltage generator connected to said third high voltage electrodes; a third housing shielding said third high voltage electrodes; a second atomizer for atomizing liquid to yield an aerosol; a third line connected to said second atomizer and to said third housing; a carrier gas container connected to said second atomizer for introducing a carrier gas into said second atomizer from said connected gas container.

20. Apparatus as claimed in claim 19, wherein said first and third high voltage electrodes are connected to a common high voltage generator.

21. Apparatus for pretreating the surface of molded material, comprising an electrostatic corona discharge means having high voltage electrodes, a high frequency, high voltage generator connected with said high voltage electrodes, and a grounded counter-electrode spaced a given distance away from said high voltage electrodes; a nozzle having a slot-like opening therein, wherein said high voltage electrodes are covered with a dielectric material and are arranged in the region of said slot-like opening of said nozzle; an atomizer apparatus for atomizing liquid to yield an aerosol; a line connecting said nozzle to said atomizer whereby aerosol in said atomizer is transported to said nozzle to exit through said slot-like opening.

22. Apparatus as claimed in claim 21, wherein a blower capable of regulating the throughput of carrier gas is connected to said atomizer.

23. Apparatus as claimed in claim 21, wherein said grounded counter-electrode is in the form of a metallic roller over which said electrically conducting molded material is conveyed.

* * * * *